Figure 1:
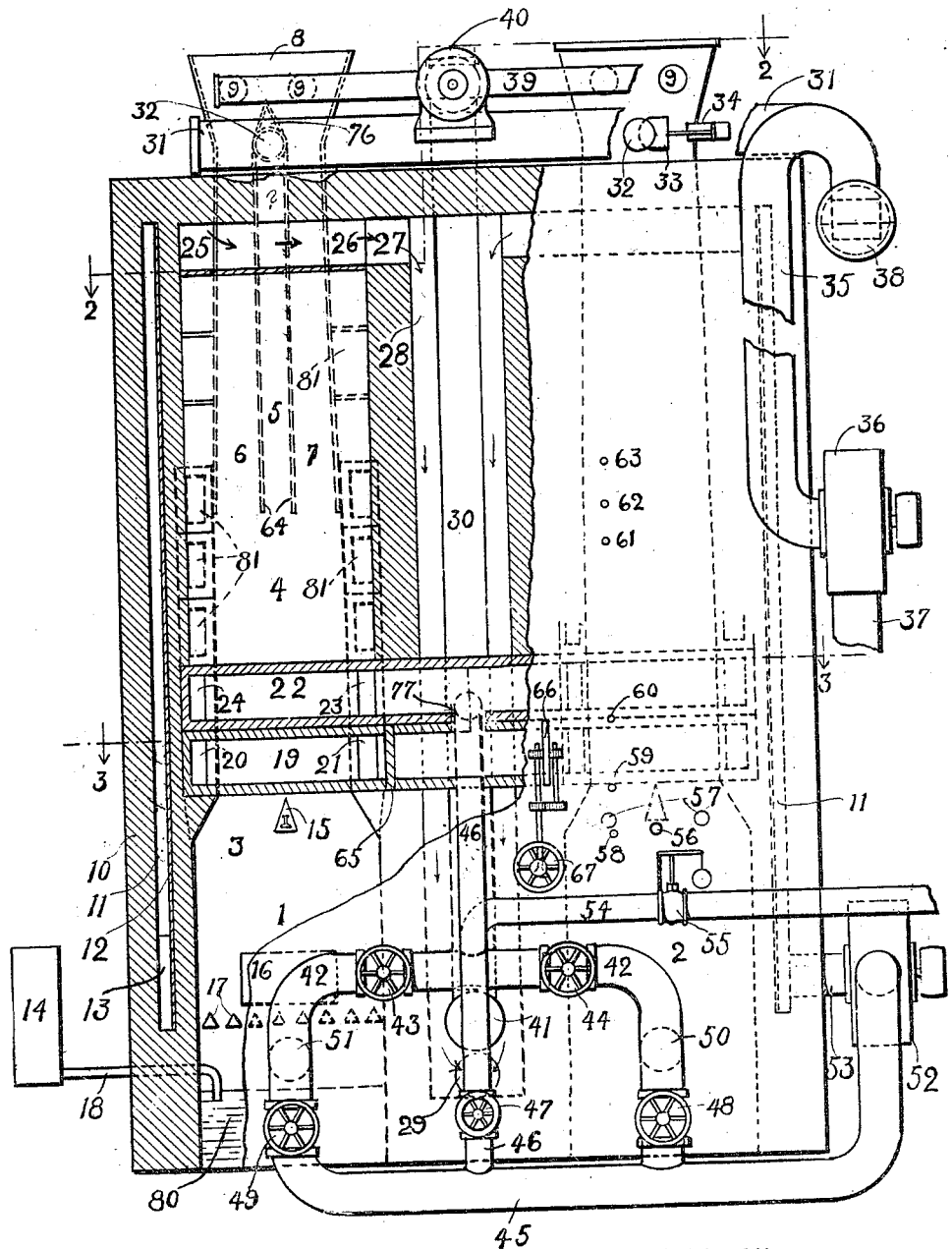

W. D. WILCOX.
METHOD OF GAS MANUFACTURE.
APPLICATION FILED JULY 23, 1915.

1,289,336.

Patented Dec. 31, 1918.
3 SHEETS—SHEET 1

WITNESSES:
Robert H Holmes
Millicent M Duval

W. D. WILCOX INVENTOR

BY
Arthur Kneisel
ATTORNEY

W. D. WILCOX.
METHOD OF GAS MANUFACTURE.
APPLICATION FILED JULY 23, 1915.

1,289,336.

Patented Dec. 31, 1918.
3 SHEETS—SHEET 2.

WITNESSES:
Robert H. Holmes
Millicent M. Duval

W. D. WILCOX, INVENTOR

BY
Arthur Kneisel, ATTORNEY

W. D. WILCOX, INVENTOR.

UNITED STATES PATENT OFFICE.

WILLIAM D. WILCOX, OF CHICAGO, ILLINOIS.

METHOD OF GAS MANUFACTURE.

1,289,336.  Specification of Letters Patent.  Patented Dec. 31, 1918.

Application filed July 23, 1915. Serial No. 41,612.

*To all whom it may concern:*

Be it known that I, WILLIAM DANA WILCOX, a citizen of the United States, residing at Chicago, in the county of Cook and the State of Illinois, have invented a certain new and useful Improvement in the Methods of Gas Manufacture, of which the following is a full, clear, concise, and exact description, reference being had to the accompanying drawings, forming a part of this application.

My invention relates to improvements in the method of gas manufacture, and in particular to the manufacture of gas from sub-bituminous coal, lignite, peat or other carbonaceous material which contains a large proportion of moisture either in a free or combined state.

The object of my invention is to provide a process by which a gas suited to use for illumination, fuel or the production of power and to general distribution for these uses may be manufactured to commercial advantage from carbonaceous materials containing moisture heretofore considered detrimental. Heretofore great difficulties have been encountered in endeavoring to obtain a gas, from lignite or peat, which is at all comparable with that obtained by the carbonization of a so-called gas coal. Lignite ordinarily contains from 10 to 35 per cent. of moisture as dug, only a portion of which can be removed by air drying. In addition it contains considerable percentages of oxygen in combination. This oxygen is given off during distillation, partly in combination with hydrogen as water vapor, and partly in combination with carbon as carbon dioxid and carbon monoxid, and this water vapor and carbon dioxid dilute the gas to such extent as to render it of low value for commercial purposes.

In the distillation of lignite or peat, water vapor is given off at all temperatures above 212 degrees F., carbon dioxid is given off at about 400 degrees F. and continues to be much the larger proportion of the produced gases other than water vapor, up to about 700 degrees F. As the temperature rises above 700 degrees F. increasing percentages of carbon monoxid, methane, hydrogen and other combustible gases are produced. If the material is subjected to such a distillation as will drive off the greater portion of the water vapor and carbon dioxid, in an ordinary retort. these products being treated as waste, a considerable percentage of the valuable gases will also go to waste. If, in the distillation, the water vapor and carbon dioxid are mixed with the entire product of combustible gas drawn from the retort, a considerable expenditure will be required for their removal by condensation and purification. With either of these two methods, there is a material loss of heat absorbed in the vaporization of the moisture, the loss being approximately 1150 B. T. U. per pound of water removed. The use of lignite and other carbonaceous materials of a similar character has thus been limited commercially to the production of producer gas which is consumed substantially at the place of manufacture for fuel and power production.

The process disclosed, described and claimed in this application overcomes the difficulties which have just been stated and permits the use of wet coal, lignite or peat in the economical production of a gas having good heating value and relatively free from inert gases.

The process in brief consists of subjecting the material to a fractional distillation comprising an initial low temperature distillation, withdrawing the mixture of water vapor and gases given off in this distillation, passing the mixture through highly heated coke thereby converting the water vapor into water gas and the carbon dioxid into carbon monoxid by union with additional carbon. Incidentally, the heat absorbed in vaporizing the moisture is used in the water gas process and the resultant gases (in which the percentage of inert components will have been reduced to a minimum) are reunited with those gases given off in a distillation of the residual at higher temperatures. The process can be more clearly described and some refinements which may be employed with advantage can be better understood by reference to the drawings which accompany these specifications. These drawings disclose apparatus suited to this process although it is not the only form of apparatus in which the process can be carried out. The process and apparatus is a further development of the process and apparatus described in application No. 26286, filed May 6th, 1915, by the applicant for a method of producing a combined coal and water-gas.

Figure 2:
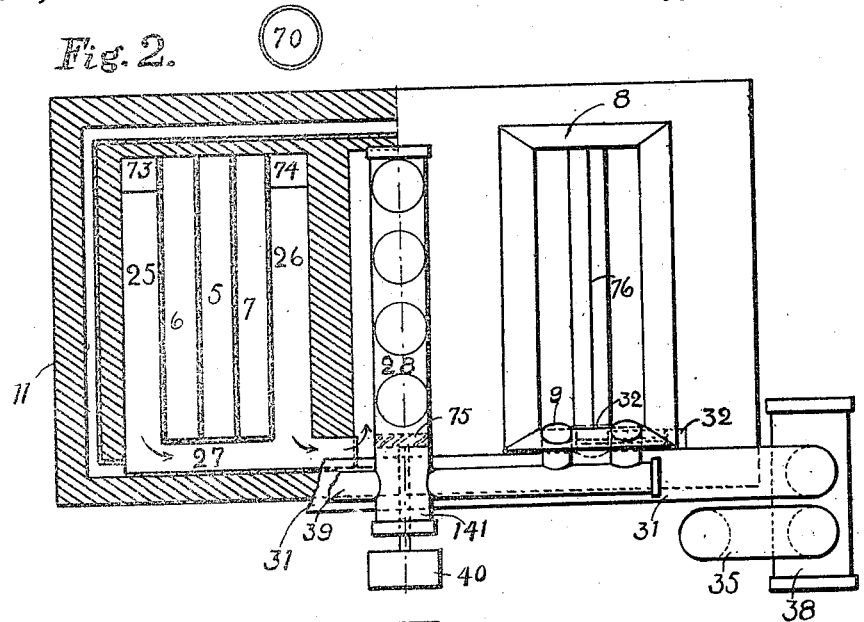
Figure 3:
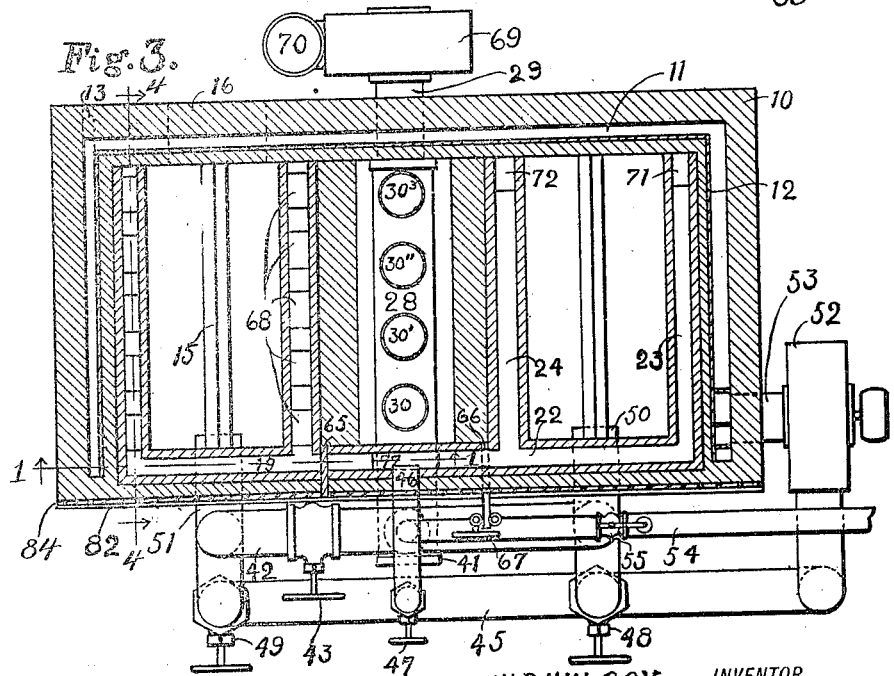
Figure 4:
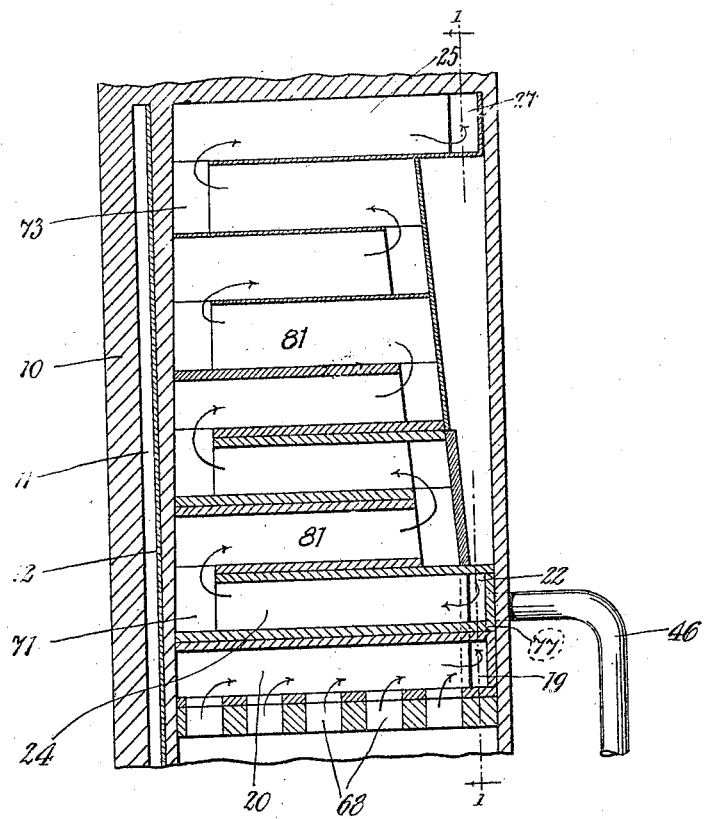

Figure 1 of the drawings shows a front elevation of an operating unit comprising two retort-generators. The left one of these has a portion of its front wall removed to show the interior arrangement. This sectional portion is along the lines 1—1 of Figs. 3 and 4. Fig. 2 shows a view along the broken line 2—2 of Fig. 1, being in part a sectional view. Fig. 3, shows a sectional view along the broken line 3—3, part being just above the collecting chambers and part just above the combustion chamber. Fig. 4 is a vertical section of the flues of the retort along the line 4—4 of Fig. 3. Throughout the drawings like characters refer to like or similar parts. The two retort-generators are similar in all respects. For the sake of simplicity, some of the apparatus is omitted in the drawings of one or the other retort-generator, but all shown on either is to be applied to both. For instance, the valve 44 shown on Fig. 1 is omitted from Fig. 3 and the operating mechanism for the damper 65 is omitted in Fig. 3 but these are identical to those shown on the other half of the drawing.

Referring to Fig. 1, two retort-generators 1 and 2 are shown with a super-heating chamber 28 between them. Each retort-generator comprises a water gas generator chamber 3, a coal gas retort 4, and a drier, comprising a gas collecting flue and chambers 6—7 at each side thereof, the drier and retort being superimposed on each other above the generator and directly connected with each other. The generating chamber has a divider 15 near its junction with the retort, and grate bars 17 near its junction with a water-sealed ash pit 80. A door 16 affords entrance to the generator chamber for clinkering the grates or making repairs. Connected with the ash pit is a water supply reservoir 14 which by the connecting pipe 18 maintains the proper level of water in the seal. The coal gas retort 4 is surrounded by walls of fire resisting material. Heating flues 81 are embedded in the side walls of the retort, these flues being connected to each other alternately at the front and back of the retort as is shown at 71, 72, 73 and 74 of Figs. 2 and 3 to form continuous flues extending from and opening into the common combustion chamber 22, which is connected at one point by opening 77 with a common collecting chamber 19, to the flues 25 and 26 at the top of the drier. The common collecting chamber 19 is connected to the collecting flues 21 and 20 which are connected by nostrils 68 (Fig. 3 or Fig. 4) to the generating chamber 3. The collecting chambers 20 and 21 are for the purpose of collecting the waste blast gases from the generator and passing them through chamber 19 and opening 77 into combustion chamber 22 where these gases are fully consumed. Chamber 19 is connected to the collecting chambers of both generators and the chamber 22 is connected to the flues of both retorts. Dampers 65 and 66 under control of mechanism such as the hand-wheel 67 and its co-acting shafts and gears provide means for shutting off either side of the common collecting chamber 19 from the combustion chamber 22. The common collecting chamber 19 and the common combustion chamber 22 are embedded in the front wall of the unit. A flue 27 embedded in the front wall at the top of the retort connects the two flues 25 and 26 and forms a passage for gases from them to the super-heating chamber 28. At the rear bottom of the super-heating chamber 28, a pipe 29 connects to an exhauster 69 which forces the gases drawn therethrough up the stack 70. The drier 5, 6, 7, is made of sheet steel or the like with the two chambers 6 and 7 on each side of the coal gas collecting flue 5. This flue 5 extends downward from the collecting hood 76 which is connected by a pipe 32 to a main 31 leading to a foul main 38. The foul main 38 is connected by a pipe 35 through any purifying apparatus (not shown) such as is well known in the art through an exhauster 36 and pipe 37 to gas storage apparatus (not shown). The hopper 8 which may be any form of gas tight hopper holding coal sufficient for several hours' supply is connected by two pipes 9—9 to a take-off 39 connected to a common reservoir 141 (Fig. 2) to which are connected the upright super-heater pipes or tanks 30, 30', 30''. A fan 75 operated by a motor 40 draws the products of distillation from the driers through pipe 39 and forces them down the pipes 30, 30', 30'' to steam collector 41 (Fig. 1 or Fig. 2) which is connected to steam main 42. By means of valves 43 and 44 steam may be directed either to the right or the left retort-generator through pipes 51 or 50 which open underneath the grate bars of generator chambers 1 and 2 respectively. These supply pipes 51 and 50 are also connected to air main 45 and are controlled by air valves 49 and 48 respectively. Air is fed to main 45 by exhauster fan 52, this air being drawn through pipe 53 from the air envelop 11 which is built in the walls 10 of the unit, extending around both sides and back and also across the upper part of the front. The lower part of the unit front is protected by a layer of mineral wool 84 and a steel facing 82, Fig. 3. A sheet steel lining 12 on the inside of the air envelop 11 prevents leakage between the heating flues and the air envelop and further imparts its heat to the air which has entered the envelop through opening 13 located at the lower rear corner of the apparatus. By means of this envelop much of the heat ordinarily lost in radiation and convection is made available for use in the process. An air supply 46 under the control of valve 47 leads from air main 45 to the common combustion chamber 22. In order that the steam supply to the grate supply pipes 51 and 50 may be constant, a pipe 54 connected with an auxiliary source of steam supply leads into steam main 42. An automatic valve 55 in the pipe 54 maintains an even pressure of steam, being adjusted to open and admit steam through 54 when the pressure in main 42 falls below a predetermined point and to close when the pressure in 42 has risen to a predetermined maximum. Peek holes 57 placed on both sides of the divider affords means for observing the temperature of the material under treatment or to accelerate its passage as may be desired. An opening 56 immediately under the divider affords means for inserting a pipe through which gas oil may be introduced into the generator if this is desired. Pipes attached at the points 58, 59, 60, 61, 62, and 63 lead to pressure gages (not shown) to inform the attendant of the relative pressure at these points. The outlet 32 at the top of each coal gas take-off is controlled by a damper 33 operated in any suitable manner such as by a steam controlled valve 34. All the valves shown are merely indicative and may be replaced by any commercial form of valve best suited for the particular need. The purpose of the apparatus thus described is clear upon considering its operation in carrying out my combined process.

To operate the apparatus a fire is kindled in both retort-generators and coke is fed to them through the hoppers until the temperature of the gas retort portion of the apparatus has reached a point favorable to the distillation of coal gas from the material. During this initial heating, the valves 43, 44, 47, 48, 49 and the dampers 65 and 66 are all open. The dampers 33 are closed until the generating chambers have become sufficiently heated for the generation of water gas. The exhauster 52 supplies air for producing this temperature.

When the proper temperature has been secured the valves of one retort-generator are closed so that no air can enter through supply pipe 51 (assuming retort-generator 1 to be the first one operated). Valve 44 of unit 2 is closed but valve 43 of unit 1 is open to permit steam from pipe 54 to enter supply pipe 51. The introduction of steam into generating chamber 3 is continued until the temperature of the material therein falls below the point favorable to water gas generation. The damper 33 at the top of retort-generator 1 is opened during the process of water gas generation in that side of the unit. At the end of a "run" period, valve 43 is closed and valve 49 is opened, valve 48 is closed and valve 44 is opened. Damper 65 is opened, and damper 66 is closed so that the waste blast gases from generator chamber 3 passed through nostrils 68, collecting flues 20 and 21, to common collecting chamber 19, through opening 77 to common combustion chamber 22, in which combustion of any remaining inflammable gases is completed by the introduction of air through pipe 46. The waste gases then pass both to the right and left of chamber 22 to enter the flues 23 and 24 of both retort-generators. These gases pass back and forth through the flues 81 embedded in the walls of the retort until they reach flues 25 and 26 and passing to the front of the unit they are conducted through flue 27 into super-heated chamber 28, down through this to the pipe 29 located at the rear bottom of the apparatus, under the pull of exhauster 69 which then forces them out through stack 70. When the temperature of the flues and walls surrounding the retort portion of the apparatus has been raised to a point favorable to the distillation of coal gas, lignite or peat is substituted for coke in the hopper 8 and it is fed to them thereafter so that the chambers 6 and 7 receive a continuous supply of material. The divider 15 functions to break up the mass of descending material and to distribute it toward the sides of the generating chamber, thereby creating immediately underneath, a central column of relatively loosely compacted coke, through which the air and steam can pass readily to the nostrils 68. The blast and "run" periods of the two retort-generators 1 and 2 are staggered so that 1 is in "blast" while 2 is in the "run" and vice versa. While 1 is in "blast" the waste gases generated therein serve to heat the flues of both retorts and while 2 is in "blast" its waste gases heat all the flues so that all the flues receive substantially a continuous supply of heat. In order that none of the waste gases will pass through flue 5 and be drawn into main 31, the damper 33 of the retort-generator under "blast" is closed sufficiently to create a back pressure which will compel the waste gases to enter the nostrils 68. As the coal under treatment descends in the chambers 6 and 7, the moisture and much of the carbon dioxid contained therein are released and drawn through the opening 9—9 into main 39 under the suction of fan 75 and are forced into the superheated tanks 30, 30', 30''. These tanks are of metal and comparatively thin. They expose a large surface to the heat which is passed into the superheating chamber 28 through flues 27 so that the waste gases generated during the "blast" periods will serve to dry these gases and steam and bring them to steam supply 42 under pressure. The carbon dioxid mixed with the steam upon being brought into contact with the highly heated coke will be broken up and carbon monoxid will be formed. The steam will be broken up to form water-gas. So much of tar and of the unsaturated hydrocarbons as are present in the mixture coming through pipe 42 may be broken up into hydrogen and methane. As the treatment of the material in the driers is to be at a comparatively low temperature it is estimated that the amount of tar given off will be small. The hot water gas rising from the retort generator 1 and passing through the material in the retort 4 on its way to the gas-collecting flue 5 will assist in distilling off the volatiles from the materials therein and form a protection against undue decomposition of ammonia gas. The exhausters 75, 69, 52 and 36 are so regulated that a balance of pressure is maintained at a point just above 64 in the drier, and just above 59 (near the nostrils 68). The air used during the "blast" period enters the lower rear left corner of the envelop at 13 and as it passes around the apparatus it absorbs heat and rises and at the upper front right corner of the air envelop it is drawn downward through a flue into a pipe 53 connected with exhauster 52 which then passes it to air main 45. The plan section of each retort-generator is rectangular being long and comparatively narrow in order that the heat radiated from the side walls and flues of the apparatus may readily penetrate to the center of the material and thus secure complete carbonization. The drier 5, 6, 7, is to be of sufficient length to permit the greater proportion of moisture and carbon dioxid in the material being driven off by the maintenance of temperature not in excess of 700 degrees F. The retort chamber 4 should be of sufficient length and so heated to complete the carbonization of the coal so that it enters the generating chamber substantially as coke. The material is fed into the chambers 6 and 7 by gravity as rapidly as the preceding material is consumed in water gas manufacture in the generating chamber 3. The ashes may be removed from the pit 80 whenever necessary by flushing or other suitable means.

The distillates resulting from the process are removed separately from each other. The initial low temperature distillates are withdrawn through outlets 9 near the top of the apparatus and are superheated and passed into the generator in place of steam while the distillates secured from the high temperature treatment are collected, in combination with the water-gas generated, through outlet 5 and outlet 32 connected therewith and these gases are conserved.

The process is not to be confused with processes in which the product is a producer gas containing a larger proportion of inert gases and particularly with producer gas processes in which the volatile gases distilled off by heating bituminous coal are passed through a zone of high temperature for the purpose of decomposing the tarry distillates. The initial heating and withdrawal is intended to stop short of the temperature at which any substantial quantity of tar is given off. This product of distillation is driven off in the higher temperature heating and is removed from the conserved gas by condensation and mechanical means at a later stage in gas manufacture.

I do not wish to limit myself to the exact proportions shown in the drawings, nor to the exact design or arrangement shown as the process may be conducted in apparatus materially different from this with substantially equivalent results.

I claim as new:—

1. In the manufacture of gas from high moisture coal, a process comprising the continuous downward passage of coal through an externally heated retort, a low temperature distillation of the coal in the upper portion of the retort, a withdrawal of the resulting gaseous products through an outlet in the upper portion of the retort, a high temperature distillation of the coal in the lower portion of the retort, a withdrawal of the resulting gaseous products through an outlet in the lower portion of the retort, controlling the flow of gas through the upper and lower outlets of the retort by regulating the exhaust pressures on each of said retorts, passing the residue from the high temperature distillation into a generating chamber below and open to said retort, alternately passing through said residue air and the gaseous products of the low temperature distillation, directing the products resulting from the passage of air through the generator into flues surrounding the retort and burning them therein, withdrawing and conserving the products resulting from the passage of the low temperature distillates through the generator and lower portion of the retort to the lower outlet thereof.

2. In the manufacture of gas from high moisture coal, a process comprising the continuous downward passage of coal in a plurality of externally heated retorts, a low temperature distillation of the coal in the upper portion of each retort, a withdrawal of the resultant gaseous products through an outlet in the upper portion of each of said retorts, a high temperature distillation of the coal in the lower portion of each of said retorts, a withdrawal of the resultant gaseous product through an outlet in the lower portion of each of said retorts, the passage of the residue from each retort into a generator chamber below and open to said retort, and alternated passage through the residue in each generator chamber, of air and of the gaseous product of the low temperature distillation so timed that the said products of low temperature distillation in each of said plurality of retorts may pass continuously into one or another of the plurality of generators, a directing of the products resulting from the passage of air through the residue in each generator into a common heating chamber supplying the flues which surround the plurality of retorts and their combustion therein, and the withdrawal and conservation of the products resulting from the passage of the gaseous products of low temperature distillation through the residue in each generator and through the lower portion of the connected retort to the lower outlet thereof.

In testimony whereof, I hereunto affix my signature in the presence of two witnesses.

W. D. WILCOX.

Witnesses:
MILLICENT M. DUVAL,
W. G. PERDUE.